United States Patent [19]

Carrara

[11] Patent Number: 5,073,329
[45] Date of Patent: Dec. 17, 1991

[54] METHOD FOR COMPRESSIONS MOULDING OF ELASTOMERS

[75] Inventor: Mauro Carrara, Viggiu', Italy

[73] Assignee: RFT S.p.A., Turin, Italy

[21] Appl. No.: 599,723

[22] Filed: Oct. 19, 1990

[30] Foreign Application Priority Data

Dec. 19, 1989 [IT] Italy .............................. 68124 A/89

[51] Int. Cl.$^5$ .............................................. B28B 5/00
[52] U.S. Cl. ................................... 264/297.5; 264/39; 264/40.1; 264/163; 264/259; 264/275; 264/297.6; 264/297.7; 264/325; 425/233; 425/236; 425/346; 425/389; 425/411
[58] Field of Search ............... 425/233, 236, 346, 389, 425/411; 264/40.1, 297.5, 297.6, 297.7, 325, 314, 159, 163, 259, 275, 161, 39

[56] References Cited

U.S. PATENT DOCUMENTS

| | | | |
|---|---|---|---|
| 1,537,697 | 7/1919 | Roberts | 425/384 |
| 1,593,878 | 4/1924 | Nagel | 425/34.3 |
| 3,337,920 | 9/1967 | Jagger et al. | 425/DIG. 47 |
| 3,809,739 | 12/1969 | Gelin | 425/346 |
| 3,844,701 | 10/1974 | Rockwell | 425/412 |

*Primary Examiner*—David A. Simmons
*Assistant Examiner*—M. Dixon
*Attorney, Agent, or Firm*—Shlesinger Arkwright Garvey

[57] ABSTRACT

Apparatus and method for forming seals, such as composite seals in rubber/metal or other materials, includes supplying a raw elastomeric mixture in the form of a suitably shaped extrusion, and optionally a metal or other material insert, to respective loading and a possibly metal or other material insert are supplied to respective loading stations of a transfer machine; the machine is provided with a plurality of carriers each composed of at least two pivoted leaves joined in book-like fashion and each carrying a respective mould half, respective spring presses movable on the machine together with the said carriers, and cam means for holding the said carriers open at the loading stations; after cleaning of the mould halves and spraying of the upper mould half with a release agent a said insert is deposited between the mould halves by means of manipulators able to self-center themselves with respect to each carrier and then a blank of raw mixture obtained by slicing the extrusion is deposited between the mould halves; finally each carrier is closed in such a way as to bring the mould halves together, disposed clamped under the corresponding spring press and fed into a polymerization tunnel.

9 Claims, 5 Drawing Sheets

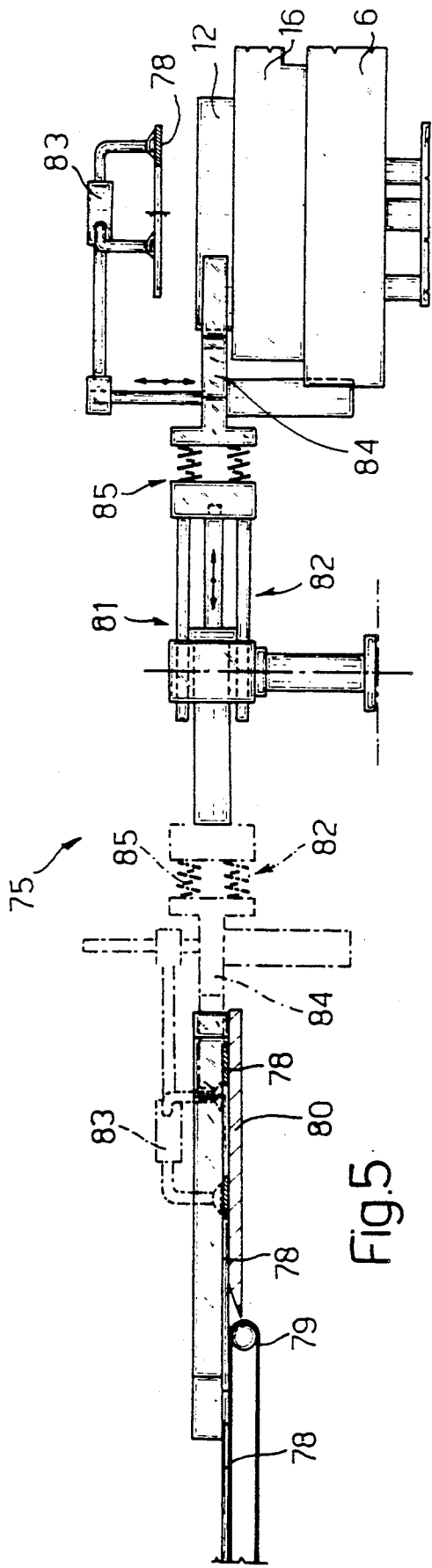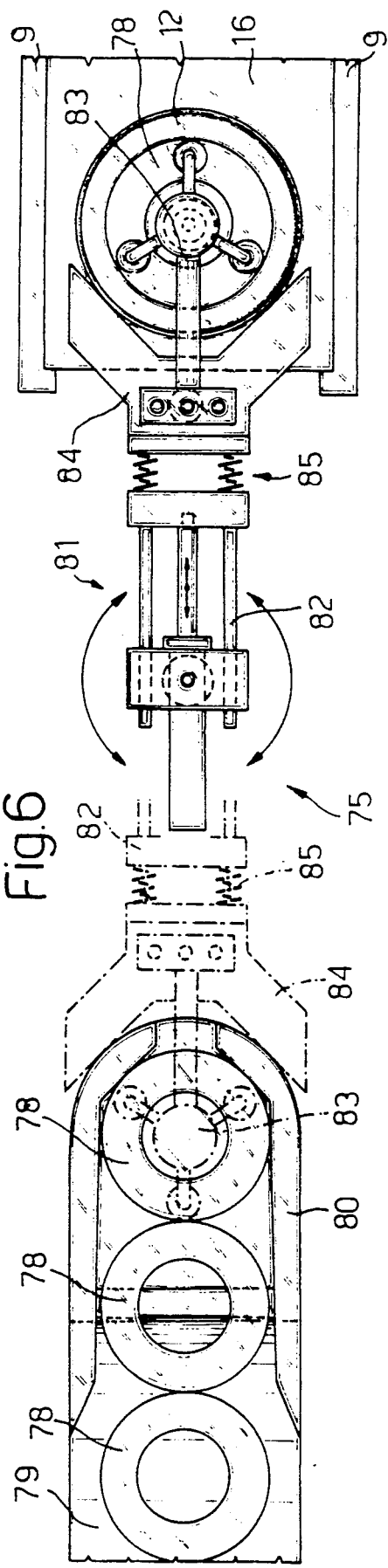

METHOD FOR COMPRESSIONS MOULDING OF ELASTOMERS

BACKGROUND OF THE INVENTION

The present invention relates to a method for forming elastomers into the form, for example, of seals adapted to be used on rolling element bearings. The invention further relates to apparatus for performing this method.

It is known to produce composite seals of rubber and metal; an example of such are the screening seals used on rolling element bearings and in numerous other mechanical applications. These seals are obtained by co-moulding the rubber part and a metal insert previously disposed in the mould. To effect the moulding both normal injection techniques and compression techniques can be used. However, both when using individual stations and when using transfer machines, the production volumes which can be obtained are lower than required. For example, in the case of rotary injection machines the injection time during which the machine must remain shut is sufficient to nullify the advantages connected with the mass production operations. The compression moulding techniques utilised on individual stations are, however, not easily adaptable to multiple station transfer machines; on the other hand, increasing productivity by the simultaneous moulding of several seals by means of moulds having a plurality of cavities, one for each element, produces inadequate results from the point of view of quality.

SUMMARY OF THE INVENTION

The object of the present invention is that of providing a process which permits compression moulding of elastomers with a high productivity and equally high quality in the final product.

The said object is achieved by the invention, which relates to a process for forming elastomers characterised by the fact that it comprises the following stages:

providing a transfer machine with a plurality of carriers each comprising at least two leaves hinged together and a first carrying a first mould half and a second carrying a second mould half, which are provided with respective conjugate recesses adapted to form a mould cavity, and a plurality of respective spring presses movable on the machine together with the said carriers;

opening of the said carriers by causing the said leaves to separate in such a way as to separate the mould halves from one another;

deposition of a blank of raw elastomeric material on the first mould half of the open leaves;

closure of the open leaves in such a way as to bring the mould halves together and inserting them under the respective spring presses; and maintaining on the closed mould halves a predetermined pressure and supplying the leaves, clamped under the spring presses, into a polymerisation tunnel, during this stage the said closed mould halves being heated to a temperature greater than ambient temperature.

The invention also relates to an apparatus for forming elastomers comprising a transfer machine of rotary type carrying a ring of compression moulding and/or transfer stations, and associated service stations disposed around the said rotary machine in a ring with constant angular pitch, characterised by the fact that the said moulding stations are carried by a table supported rotatably by a fixed based and each comprising a spring press disposed in a radially innermost position, a radial guide terminating under the said spring press, and a hinged carrier supporting a single mould adapted to mould a single monolithic workpiece; the hinged carrier including a first leaf resting on the said table and supporting a first mould half and a second leaf hinged to the first in a book-like manner and supporting a second mould half; the said rotary machine further including cam means fixedly disposed to the base along an angular sector of the said machine, of predetermined width and adapted to cooperate with the said second leaves of the carriers for selectively producing, respectively at the beginning and at the end of the said angular sector, separation and subsequent re-approach of the mould halves to open/-close the respective moulds defined by them; and the said service stations including means for radially displacing the said carriers along the said guides and adapted to extract the said carriers from under the respective spring presses immediately before the said angular sector of the machine provided with the cam means and to insert the carriers under the spring presses immediately after the said sector, and means for depositing into the first mould halves a raw elastomeric mixture; a second angular sector of the said machine, delimited between the said means for displacing the carriers on the opposite side of the sector occupied by the cam means, being provided with a polymerisation tunnel through which the said table with the moulding stations is adapted to pass.

BRIEF DESCRIPTION OF THE DRAWINGS

For a better understanding of the invention a nonlimitative description of an embodiment is now given with reference to the attached drawings, in which:

FIGS. 5 and 6 illustrate in elevation and in plan view from above the details of another component of the system of FIG. 1.

DETAILED DESCRIPTION OF THE INVENTION

Figure 1:
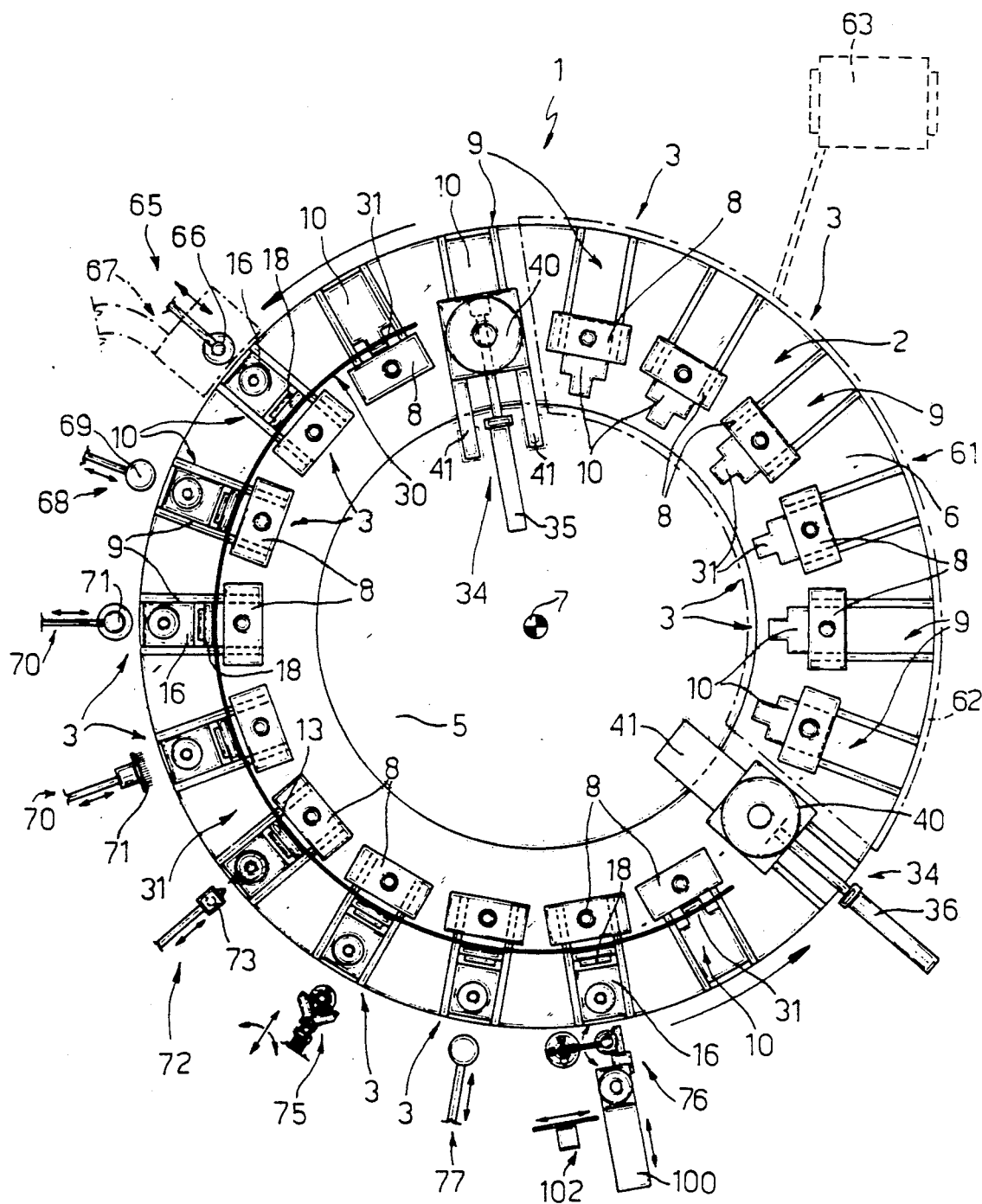
FIG. 1 schematically illustrates, in plan view from above, a moulding system formed according to the invention.

Before describing the method of the present invention it is appropriate to describe the system for performing it, which is generally indicated with the reference numeral 1, and which is a non-limitative embodiment illustrated purely by way of example.

With reference to FIGS. from 1 to 4, the system 1 serves to form, using elastomers, composite elements of rubber/metal, which are known and not illustrated for simplicity, for example seals having an elastomeric sealing part reinforced by a metal insert, and essentially comprises a transfer moulding machine 2, in the specific example a rotary type, carrying a plurality of compression moulding (and/or transfer) stations 3, and a plurality of service stations disposed radially in a ring and with constant angular pitch around the machine 2; this comprises a fixed base 5 freely supporting a driven table 6 rotatable in a discrete manner, that is to say in successive steps by a fraction of a turn, about a central axis 7 of the base 5 by means of suitable motor means which are known and not illustrated for simplicity. The mould stations 3 are carried directly by the table 6 in such a way as to rotate with it about the axis 7, and each includes a spring press 8 of substantially known type 5 disposed on the table 6 in a radially inner position, a radial guide 9 formed throughout the width of the table 6 and terminating under the respective spring press 8, and a book-folded blade-type carrier 10 slidably mounted within the guide 9 and supporting a single 10 mould 11 comprising, in the specific example illustrated, referred nonlimitatively to the case of compression moulding stations, a first, lower mould half 12, and a second, upper, mould half 13, and shaped in such a way as to mould a single said composite element at a time; 15 for example, the mould halves 12 and 13 are each provided with a single recess 14 to form the mould cavity.

Figure 3:
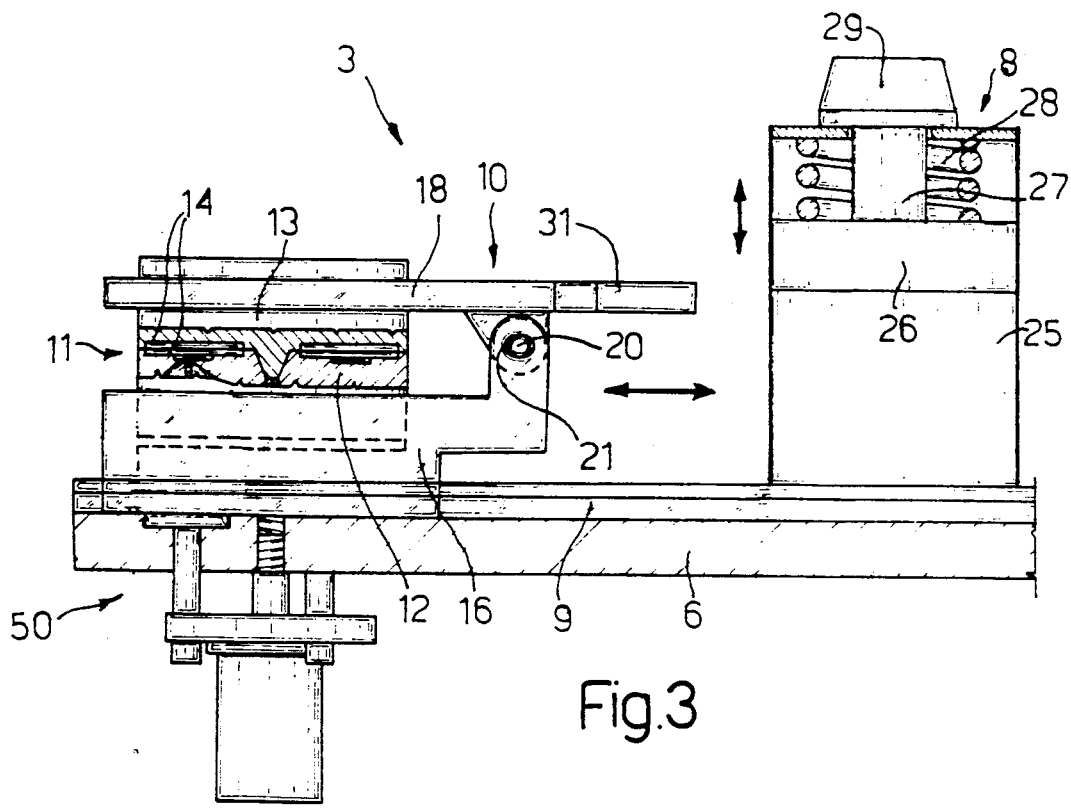
FIGS. 3 and 4 illustrate in elevation respective sectioned views of the detail of FIG. 2.
Figure 4:
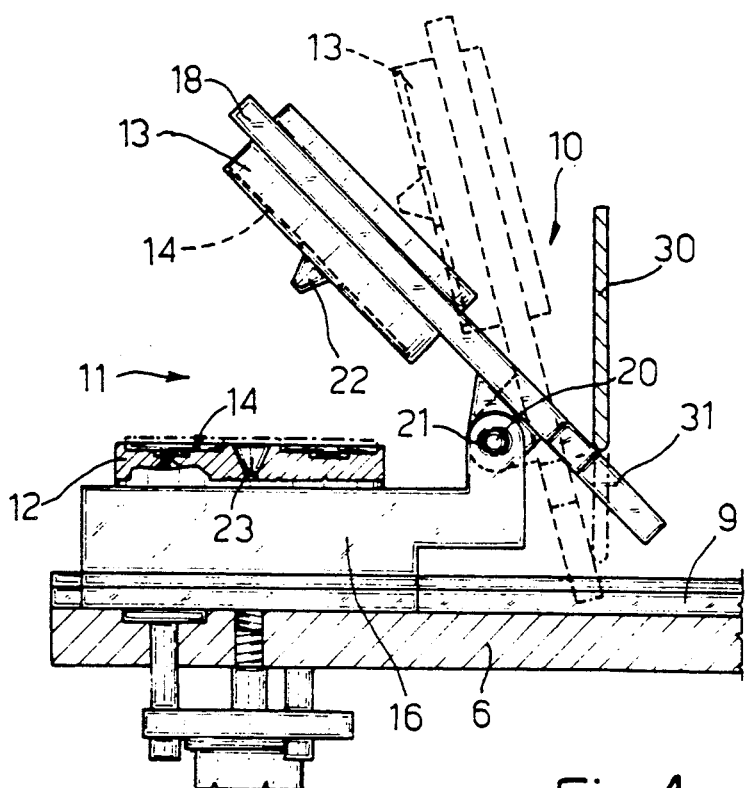

Each carrier 10 comprises a first leaf 16 resting on the table 6 slidably engaged on the respective guides 9 and supporting the mould half 12, and a second leaf 18 pivoted to the first in the manner of a book hinge and supporting the mould half 13; in particular, the leaves 16, 18 are hinged together by a pin 20 (or a pair of coaxial pins) supported by the leaf 16 within respective slotted seats 21 (FIGS. 3 and 4) in such a way that the leaf 18 of each carrier 10 is connected, with the possibility of slight play, to the underlying leaf 16; preferably, moreover, the leaf 18 carries the mould half 13 freely and the mould halves 12, 13 are provided with conical coupling means defined, for example, by a central conical projection 22 of the mould half 13 which can be coupled into a conical cavity 23 of the mould half 12; in this way self-centring of the upper mould half on the lower mould half is ensured upon mutual approach of the leaves 16, 18 in that the entrance of the projection 22 in the cavity 23 causes, in the presence of misalignment, a displacement of the pin 20 in the seats 21 such as to compensate for such misalignment.

Each spring press 8 (FIG. 3) comprises, on the other hand, an inverted U-shape support 25 fixed to the table 40 6, a jaw 26 shaped as a piston and supported by a rod 27 passing through the summit of the support 25, and a spring 28 made of special steel capable of conserving its elastic characteristics even at high temperatures, and fitted pre-loaded between a movable shoulder defined 45 by the piston 26 and a fixed shoulder defined by the top of the support 25; the lower end-of-stroke position of the piston 26 is determined by abutment, against the upper end of the support 25, on the opposite side of the spring 28, of a prismatic head 29 fixed to the rod 27. 50

Figure 2:
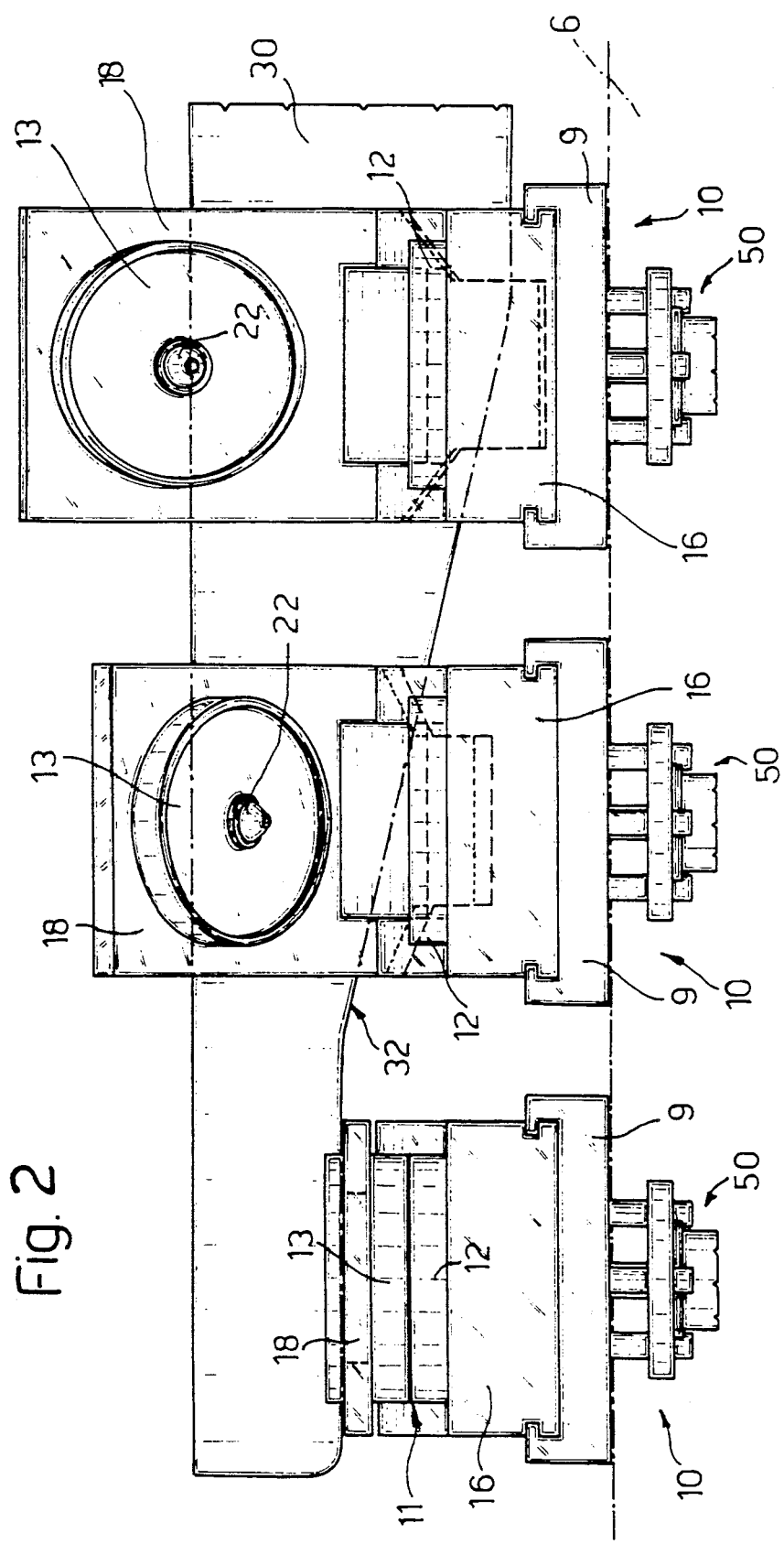
FIG. 2 illustrates on an enlarged scale a detail of the system of FIG. 1.

To obtain opening/closure of the carriers 10 and the associated moulds 11, or rather rotation of the leaves 18 on the pins 20 in such a way as to move the leaves 16, 18 and their associated mould halves 12, 13 fixed to them apart or together, the rotary machine 2 further includes 55 cam means, in the specific example defined by a shaped bulkhead 30 disposed fixed to the base 5 along an angular sector 31 of predetermined width of the machine and defined by the circumferential development of the bulkhead 30 itself, acting to cooperate with the upper leaves 60 18 of the carriers 10; in particular (FIG. 2) the leaves 18 are provided rearwardly with respective catches 31 adapted to cooperate with a lower edge 32 of the bulkhead 30; this, at the beginning and at the end of the bulkhead 30 is higher than the catches 31, whilst at its 65 ends it is inclined obliquely to approach close to the table 6, from where it remains a substantially constant distance for the whole of the intermediate length of the bulkhead 30. In use, the cam bulkhead 30, coming successively into contact with the tangs or catches 31 of the leaves 18 of each carrier 10, causes (at the beginning of the sector 31) the raising of the leaves 18 as illustrated in broken outline in FIG. 4, opening the moulds 11 and, subsequently (at the end of the sector 31), the closure of these with return of the leaf 18 into the position illustrated in solid outline, against the underlying leaf 16; therefore, the carriers 10 which are located from time to time in the sector 31 have their moulds 10 open and the inner recesses 14 of these accessible.

Immediately before the beginning and immediately after the end of the sector 31 there are also disposed two of the said service stations surrounding the machine 2, which are indicated with the reference numeral 34, which comprise means for radially displacing the carriers 10 on the table 6 along the guides 9 and means for actuating the spring presses 8, in particular to raise the pistons 26 against the action of the springs 28; in the specific example illustrated, these means consist of elevators 40 supported by the fixed base 5, for example by means of brackets 41, which are adapted to grip and raise the prismatic heads 29 of the rods 27 gradually as the presses 8 pass in succession under them, and actuators 35 and 36, disposed in correspondence with the elevators 40, respectively at the beginning and at the end of the sector 31 (in the sense of rotation of the table 6 indicated by the arrow in FIG. 1) and on the interior and exterior of the base 5, provided with devices of a type which are known and not illustrated for simplicity, for mechanically hooking or, preferably, magnetic contact with the carriers 10 and adapted, with the rods 27 raised, to selectively extract the carriers 10 from beneath the respective presses 8 immediately before the carriers 10 enter the sector 31, and to insert the carriers 10 under the spring presses 8 immediately after the carriers 10 leave this sector.

In a possible variant not illustrated for simplicity, if the workpiece to be formed is of particularly complex shape the mould 11 can be sub-divided into more than two mould parts and the carriers 10 will then be formed in such a way as to be composed of several leaves.

According to a further characteristic of the system 1 according to the invention, the lower mould halves 12 are provided with a recess 14 having negative angles, that is having a form such as to define at least an undercut adapted to retain the composite element produced by the lower mould half upon moulding, as well as a known extractor device 50; between the stations 34 and on the opposite side from the angular sector 31 there is delimited a second angular sector 61 of the machine 2, which is provided with a known polymerisation tunnel 62 through which the table 6 with the mould stations 3 is adapted to pass; preferably this tunnel 62, illustrated only schematically in broken outline, is insulated and provided with substantially closed fluid-tight sealed inlet and outlet, and blower means 63 for effecting a forced circulation of air (possibly heated) within its interior. The table 6, on the other hand, is provided under the spring press 8 with electrical resistances not illustrated for simplicity, in such a way as to be able to provide heat to the moulds 11 whilst these are located within the tunnel 62 without necessarily involving flows of hot air which have a low efficiency from the thermal point of view.

The installation 1 according to the invention is finally provided, in correspondence with the sector 31 of the machine 2, in which the moulds 11 are open, with a series of service stations to load the starting materials and discharge the finished products, as well as possible cleaning operations. In particular, in the direction of the arrow (FIG. 1) that is in the direction of rotation of the table 6, at the beginning of the sector 31, immediately after the output from the tunnel 62 and passage past the respective station 34, there is disposed a trimming station 65 in which a brush or rotary trimming tool 66 is carried for acting successively, on each mould 11 which transits past it, and which is open because of the action of the cam bulkhead 30, to remove possible burrs present on the workpieces, which are held on the lower mould halves 12 because of the negative angle of the recesses 14 of these; this station is preferably provided with a suction cap 67. Subsequently, there is located a discharge station 68 at which the devices 50 are actuated in such a way as to extract the finished and trimmed workpieces from the interior of the mould half 12; the extracted workpieces are withdrawn, for example, by a sucker 69, and removed from the system 1.

Again, subsequently, there are two cleaning stations 70 in which respective rotating brushes 71 having soft bristles, for example of nylon, clean the recesses 14 of the mould halves 12, 13 which are spaced (obviously, in the case of the carriers 10 having more than two mould parts there will be as many cleaning stations as there are mould parts). Finally, after passage through a station 72 in which a nozzle 73 sprays a release agent (or other similar anti-adherent chemical compound) onto the recesses 14 of the mould half 13, the carriers 10 are then carried to respective loading stations 75 and 76 between which is disposed a checking station 77.

With reference to FIGS. 5 and 6, which respectively illustrate the station 75 in elevation and in plan from above, this serves for selectively loading onto the mould halves 12 a metal insert 78, in the specific example an annular insert, and essentially comprises means for gripping, support and release of the insert 78 and a device for self-centring thereof with respect to the second mould half 12. In particular, the station 75 is provided with a feeder 79 for delivering inserts 78, for example a belt which deposits them one at a time onto a fixed platform 80 and a manipulator 81, for example disposed between the rotating table 6 on which the mould halves 12 are disposed and the platform 80, and comprising a tiltable and extendable arm 82, a gripper member 83, in the specific example of the pneumatic vacuum type (but which could be any mechanical or magnetic type) and a coupling element 84 having inclined coupling walls, V-shape in the specific example, adapted to cooperate, in the specific example tangentially, with each mould half 12 which passes through the station 75 and, for example, also with the platform 80, which is shaped as required; the gripper member 83 is directly and rigidly supported by the V-shape element 84, and this is in turn carried by the tiltable arm 82 by an elastic joint 85 able to support the element 84 with the possibility of radial movement and rotation with respect to the second mould half 12 and the arm 82.

Consequently the arm 82 can first be rotated and extended towards the platform 80, occupied by an insert 78; when the element 84 comes into cooperation with the perimetral edge of the platform 78 the self-centering of the gripper member 83 on the insert 78 is caused, which can therefore be correctly withdrawn; then the arm 82 is retracted, rotated and extended towards the mould half 12 momentarily closed in front of the station 75; the element 84 cooperates with the mould half 12 by stressing the joint 85, which permits the element 84 to adjust itself in such a way as to create the member 83 and the associated insert 78 carried by it on the recess 14 of the mould half 12. At this point the member 83 releases the insert 78, which consequently adapts itself in the correct position on the mould half 12 and the arm 82 can be retracted for another loading cycle, which will involve the next mould half 12 of the table 6; whereby to avoid blockage or rejects in the case of non-optimum operation of the station 75 the checking station 77 is provided immediately after it, in which latter station there is effected, in any suitable way, for example with optical sensors, checking to establish that deposition and correct positioning of the insert 78 has taken place.

Figure 7:
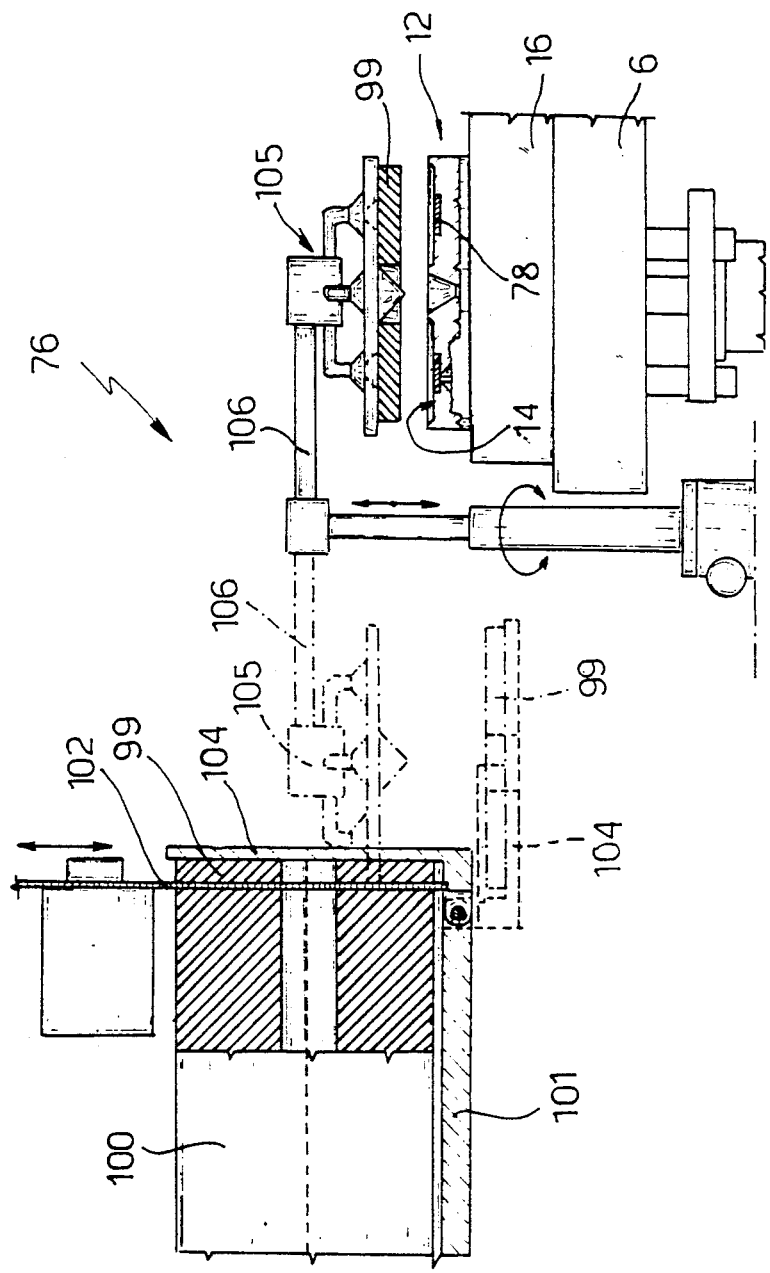
FIG. 7 illustrates in elevation and on an enlarged scale a further detail of the system of FIG. 1.

With reference to FIG. 7, after loading of the inserts 78 and the associated checking, the carriers 10 with the moulds 11 open are moved one at a time to the station 76 where deposition into the recess 14 of the mould half of a blank 99 takes place, in the specific non-limitative illustrated example an annular blank made of a raw or "green" elastomeric mixture, that is one which must still be subjected to cross-linking connected with the polymerisation or "vulcanisation" process; this blank can be obtained by extruding the mixture, which is prepared off line in a known way, away from the installation 1, in the form of a shaped, plastically deformable extrusion 100, in the specific example shaped as a tube, which is spirally wound on a support platform 101 and slowly unwound from this towards the machine 2, close to which the station 76 is provided, for example, with a circular saw 102 by means of which the extrusion 100 is progressively sliced, forming slices which constitute the blanks 99 to be loaded; for example after slicing each blank 99 is carefully placed on a tippable plate 104 from which it is lifted by a pneumatic gripper member 105 carried by a rocker arm 106 which deposits it in the recess 14 of the mould half 12 already partly occupied by the previously deposited insert 78.

In use, the raw mixture, which may consist of a thermoplastic rubber, is supplied to the station 76 in the form of blanks 99 adapted to be deposited in the recesses 14; these blanks, depending on the form of the workpiece to be obtained, can be annular or otherwise and can be obtained in the previously described manner or in any other manner; if the workpiece to be obtained is a composite workpiece of metal/rubber, inserts 78 are also supplied to the station 75, these also being made separately in a known way; obviously, if the workpiece to be obtained is composed only of rubber the station 75 is disactivated or can be omitted. On the machine 2, in particular on the rotating table 6, the carriers 10 are prearranged, provided with moulds 11 and the table 6 is made to rotate through successive steps, at each step being made to turn by a multiple of the angular pitch between the carriers 10 in such a way that the carriers 10 are always made to advance by a quantity equal to a multiple of the effective distance (pitch) between them; after each such rotation, equal to a fraction of a revolution, the table 6 is maintained stationary, whilst on the carriers 10 present in the sector 31 there are effected, simultaneously, the various stages of the process which involve the moulds 11 open, each stage being executed at a different service station surrounding the machine 2.

In particular, as the carriers 10 enter the sector 31, the cam 30 executes a mould opening stage by the effect of the divergence imposed on the leaves 16, 18 with consequent separation of the mould halves 13 from the mould halves 12; then, after execution in the station 65 of a trimming of the finished workpieces these, in the subsequent station 68 are removed from the mould half 12, on which they are held upon opening of the respective mould 11 by the effect of the negative angle of the recess 14 and by the effect of the previously sprayed release agent on the corresponding mould half 13; in the meantime, on the emptied carriers 10, which find themselves at the stations 70 and 72, there are performed respective brushing operations on the mould halves 12, 13 and spraying of a chemical release agent of any known type on the internal surfaces of the mould half 13 provided with the respective recess 14; simultaneously, on the carriers 10 which find themselves at the stations 75, 76, 77 and which have already passed through the stations 70, 72 there are performed the stages of possible deposition of the metal insert 78 and deposition of the blank 99 (after checking of the presence of the possible insert 78) as previously described for each individual station.

At this point the manipulators and the brushes of the stations 65, 68, 70, 72, 75, 76 are retracted out from the path of the carriers 10 and the table 6 is made to turn through another step or fraction of a revolution; since this rotation is equal to a multiple of the angular pitch between the carriers 10 with the consequence that, upon subsequently stopping, the carriers are displaced in correspondence with the stations immediately downstream with respect to the direction of rotation of the table 6 adapted to perform the next stage in the fabrication process; for example the carriers 10 which have just passed the stations 65, 68 are carried to station 70 and, successively, station 72; those coming from these stations are displaced to stations 75, 76 and those coming from these stations leave the sector 31 being subjected to a closure stage by the action of the cam 30 with consequent closure of the moulds 11 and clamping and superimposition of the mould halves 12, 13 with the inserts 78 and blanks 99 locked between them; those which have just been subjected to the closure stage pass one at a time into the station 34 immediately downstream from the sector 31 where they are displaced radially and inserted under the spring presses 8 which provide the moulding pressure; at the subsequent fraction of a rotation the carriers 10 enter into the tunnel 62 where they are heated and where they remain for numerous fractions of a rotation until they re-emerge at the other station 34 after a time sufficient for complete polymerisation of the raw elastomeric mixture.

In the case of transfer moulding the single operating difference with respect to that described hereinabove consists in the fact that the blanks 99, rather than being laid directly into the recesses 14 of the mould halves 12 are gently laid in respective chambers formed in a mould part immediately underlying the upper mould half 13, which is provided with a pin or plunger operable, upon closure of the mould, to penetrate into this chamber to cause expulsion from it of the raw mixture, fluidised by the joint effect of the heating and the pressure, with consequent emission of the raw mixture, through suitable channels formed in the mould, to the interior of the mould cavity where cross-linking takes place.

Additionally, in correspondence with the station 34 upstream of the sector 31 the carriers are extracted from under the spring presses 8 to re-enter the sector 31 itself, after having performed a complete revolution, and commence a new cycle with the trimming and discharge of the composite workpieces in the meantime formed in the moulds 11.

In the non-limitative example illustrated the table 6 is turned through a fraction of a revolution exactly equal to the angular pitch between the carriers 10, or rather the said multiple is equal to one; therefore each time the machine 2 stops each stage is performed only once and on a different carrier. However, for example for the purpose of increasing productivity, the number of carriers 10 and the diameter of the machine 2 could be increased and more than one service station could be provided for each stage to be performed and consequently the table 6 would turn at each step through a fraction of a revolution greater than the angular step between the carriers 10, for example a multiple of this value equal to two or three etc. In this case, for example if the chosen multiple is two, it would be necessary to duplicate each station and the productivity would be doubled, each stage being effected simultaneously on a number of carriers 10 equal to the said multiple, that is on two carriers 10 adjacent to one another or, equally well, spaced from one another by one or more other carriers 10.

I claim:

1. A process for compression moulding of elastomers wherein a plurality of carriers (10) each including a cooperating spring press (8) are advanced along a first substantially closed path on a transfer machine (2) for cyclically recirculating through a plurality of working stations, each of said carriers comprising at least two leaves (16, 18) hingedly connected to each other, a first leaf carrying a first mould half (12) and a second leaf carrying a second mould half (13), said first and second halves being provided with cooperating recesses (14) adapted to form a mould cavity when said first and second halves are closed against each other, said process comprising the steps of:
   a) advancing said spring presses (8) of said carriers along a second substantially closed path generally parallel to said first path for said carriers and substantially at same speed, each of said presses (8) comprising a jaw means (26) and a cooperating spring means (27);
   b) opening selectively each of said carriers by causing one of said leaves (16, 18) to rotate relative to the other so as to separate the respective mould halves;
   c) maintaining said carriers in the open position;
   d) depositing in a first mould half (12) of each carrier opened in step (b) a blank (99) of raw elastomeric mixture;
   e) closing said carriers with corresponding blanks therein by causing one of said leaves (16, 18) to rotate towards the other;
   f) lifting selectively said jaw means (26) of each of said spring presses (8) for placing under said lifted jaw means a corresponding closed carrier;
   g) displacing the carriers (10) placed under the corresponding jaw means in a first direction generally transverse to said first path;
   h) clamping the carriers (10) displaced in step (g) under a corresponding spring press (8);
   i) applying to said halves of each of said clamped carrier a predetermined moulding pressure by the spring means (28) of the corresponding spring press (8);
   j) feeding said spring presses (8) and said carriers (10) clamped under corresponding presses into a polymerisation tunnel (62) wherein said closed mould halves are heated to a temperature greater than the ambient temperature; and k) removing said carriers (10) from under said spring presses (8) by displacing said carriers (10) transversely to said first path in a second direction opposite to said first direction.

2. A process according to claim 1, comprising the step of:
a) depositing an insert (78) into one of said mould halves of at least one open carrier.

3. A process according to claim 1, comprising the steps of:
a) removing said carriers from said polymerization tunnel after heating step (j);
b) selectively opening said carriers after said removing step (k);
c) bringing said opened carriers to a discharge station (68) where a workpiece formed of said blank is extracted form the mould halves; and
d) selectively bringing said carriers after said workpiece extraction step to loading stations (75, 76) for carrying out deposition steps.

4. A process according to claim 2, comprising the step of:
a) checking the presence and correct the position of said insert on said one of said mould halves of said at least one carrier.

5. A process according to claim 3, comprising the steps of:
a) trimming workpieces prior to the extraction thereof from corresponding carriers by means of at least one rotating tool (66) provided with a sucker (67);
b) cleaning the mould halves of the open carriers (10) by respective rotating brushes (71); and
c) spraying on one of said mould halves of each open carrier a release agent.

6. A process according to claim 2, wherein:
a) the deposition of the inserts (78) step is automatically performed by utilizing a manipulator which is self-centering with respect to the carriers.

7. A process according to claim 1, wherein:
a) said blank of raw elastomeric mixture (99) is a substantially circular element obtained by slicing a deformable extrusion (100) formed of said raw elastomeric mixture.

8. A process according to claim 1, wherein:
a) said carriers (10) are advanced after each step by an amount equal to a multiple of the pitch between the carriers, and said steps are performed simultaneously on a number of carriers equal to said multiple.

9. A process according to claim 1, wherein:
a) each of said carriers is selectively brought into cooperative engagement with cam means (32) in order to open the carriers by causing one of said leaves (16, 18) to rotate relative to the other so as to separate the respective mould halves to successively keep said carriers open; and
b) after having deposited said blank (99) each of said open carrier is disengaged from said cam means to close said halves.

* * * * *